United States Patent [19]

Kakumu

[11] Patent Number: 5,658,409
[45] Date of Patent: Aug. 19, 1997

[54] LOW NOISE TIRE

[75] Inventor: Kiichiro Kakumu, Kobe, Japan

[73] Assignee: Sumitomo Rubber Industries, Ltd., Hyogo-ken, Japan

[21] Appl. No.: 587,572

[22] Filed: Jan. 17, 1996

Related U.S. Application Data

[62] Division of Ser. No. 250,116, May 26, 1994, abandoned, which is a continuation of Ser. No. 987,252, Dec. 7, 1992, abandoned, which is a continuation of Ser. No. 531,648, Jun. 1, 1990, abandoned.

[30] Foreign Application Priority Data

Jun. 6, 1989 [JP] Japan ................................ 1-143794

[51] Int. Cl.$^6$ .............................. B29D 30/00; B60C 11/03
[52] U.S. Cl. ..................................... 156/110.1; 152/209 R
[58] Field of Search .................... 152/209 R, 209 A, 152/209 B, 209 D; 156/110.1, 127, 128.6, 129

[56] References Cited

U.S. PATENT DOCUMENTS

| | | | |
|---|---|---|---|
| 2,014,255 | 9/1935 | King | 152/209 R |
| 4,178,199 | 12/1979 | Lippman et al. | 152/209 R |
| 4,340,103 | 7/1982 | Nilsson. | |
| 4,462,445 | 7/1984 | Goergen. | |
| 4,693,290 | 9/1987 | Curtiss et al. | 152/454 |
| 4,722,378 | 2/1988 | Carolla et al. | 152/209 R |
| 4,788,651 | 11/1988 | Parker et al. | 152/209 R |

FOREIGN PATENT DOCUMENTS

| | | |
|---|---|---|
| 0268436 | 5/1988 | European Pat. Off. . |
| 1317808 | 12/1989 | Japan . |

OTHER PUBLICATIONS

M.G. Richards, "Automotive Tire Noise–A Comprehensive Study", Sound & Vibration, May 1974, pp. 42–47.

*Primary Examiner*—Geoffrey L. Knable

[57] ABSTRACT

A low noise tire having circumferentially spaced tread grooves each having a paired groove spaced apart therefrom by a distance substantially the same as the circumferential length of a ground contacting region of the tread when the tire is mounted on a regular rim and inflated to a normal internal pressure and loaded with a normal load, whereby pattern noise can be suppressed.

10 Claims, 5 Drawing Sheets

LOW NOISE TIRE

This application is a divisional of application Ser. No. 08/250,116 filed on May 26, 1994, now abandoned which is a continuation of application Ser. No. 07/987,252 filed on Dec. 7, 1992, which is a continuation of application Ser. No. 07/531,648, filed on Jun. 1, 1990, both now abandoned.

BACKGROUND OF THE INVENTION

The present invention relates to a low noise tire in which pattern noise caused by axial grooves is suppressed.

From the point of view of environmental pollution as well as ride comfort, automobile noise, especially in high-speed running, is a problem to be solved.

The main part of the automobile noise is a tire noise, and the main part of the tire noise is pattern noise. Such pattern noise is generated as follows.

The tread groove volume, specifically the axial groove volume is greatly and periodically changed when contacting the ground and leaving the ground during running, which vibrates the air and therefore a pressure wave of the air is generated as noise.

Generally, there is a remarkable peak in the sound energy spectrum around the frequencies determined by the circumferential pitches of the tread pattern and the tire rotating speed, and when the peak value is large. It makes the generated sound very noisy.

Therefore, to lower the pattern noise, methods such as variable pitching methods have been proposed.

In the variable pitching methods, in order to lower the absolute value of the peak, several different pitches are arranged in the circumferential direction of the tire in a special manner to disturb synchronism of the noise pulses generated from the tread pattern and thereby to disperse the noise sound energy into a wide frequency range.

However, the optimum pitching is not always optimum in view of other tire performances, and often deteriorates tire performances. For example, tread elements with different pitches have different rigidities, which is liable to cause uneven tread wear whereby the tire has a short wear life, and further sometimes unfavorably affects the vibration characteristics such as RFV and RRO.

SUMMARY OF THE INVENTION

An object of the present invention is therefore, to provide a low noise tire in which the noise characteristics can be improved without sacrificing other tire characteristics.

According to one aspect of the present invention, a low noise tire has a tread provided with a tread pattern comprising axial grooves arranged at regular pitches in the circumferential direction of the tire, wherein the circumferential length of the ground contacting region of the tire when the tire is mounted on a regular rim and inflated to a normal internal pressure and then loaded with a normal load, is substantially equal to integral times the pitch.

According to another aspect of the present invention, a low noise tire has a tread provided with a tread pattern comprising axial grooves arranged at irregular pitches in the circumferential direction of the tire, wherein the circumferential length of the ground contacting region of the tire when the tire is mounted on a regular rim and inflated to a normal internal pressure and then loaded with a normal load, is substantially equal to integral times the mean pitch length of the above-mentioned irregular pitches.

The inventor studied the mechanism of generating noise, using a test tread pattern showing in FIG. 5. The test pattern comprises two parallel, straight circumferential grooves and one axial groove (a) extending parallel to the axial direction of the tire from one of the circumferential groove (b) to the tread edge. FIG. 6 shows the waveform of the sound pressure generated from the axial groove (a). From the waveform, it was found that the axial groove generates remarkable pulses P1 and P2 at the moment T1 when the groove contacts the ground and the moment T2 when the groove leaves the ground, respectively, and the pulse P1 and the pulse P2 are opposite in sound pressure. This fact may be explained by the fact that the air flows out from a groove decreased in volume when contacting the ground (T1) and on the other hand air flows into the groove increased in volume when leaving the ground (T2).

Therefore, in the present invention, the pitches of the circumferentially spaced axial grooves are set in such a way that said grooves contacting the ground and leaving the ground occur at the same time so as to generate opposite pulses which cancel each other.

BRIEF DESCRIPTION OF THE DRAWINGS

Embodiments of the present invention will now be described in detail with reference to the drawings, in which.

DETAILED DESCRIPTION OF THE INVENTION

Figure 1:
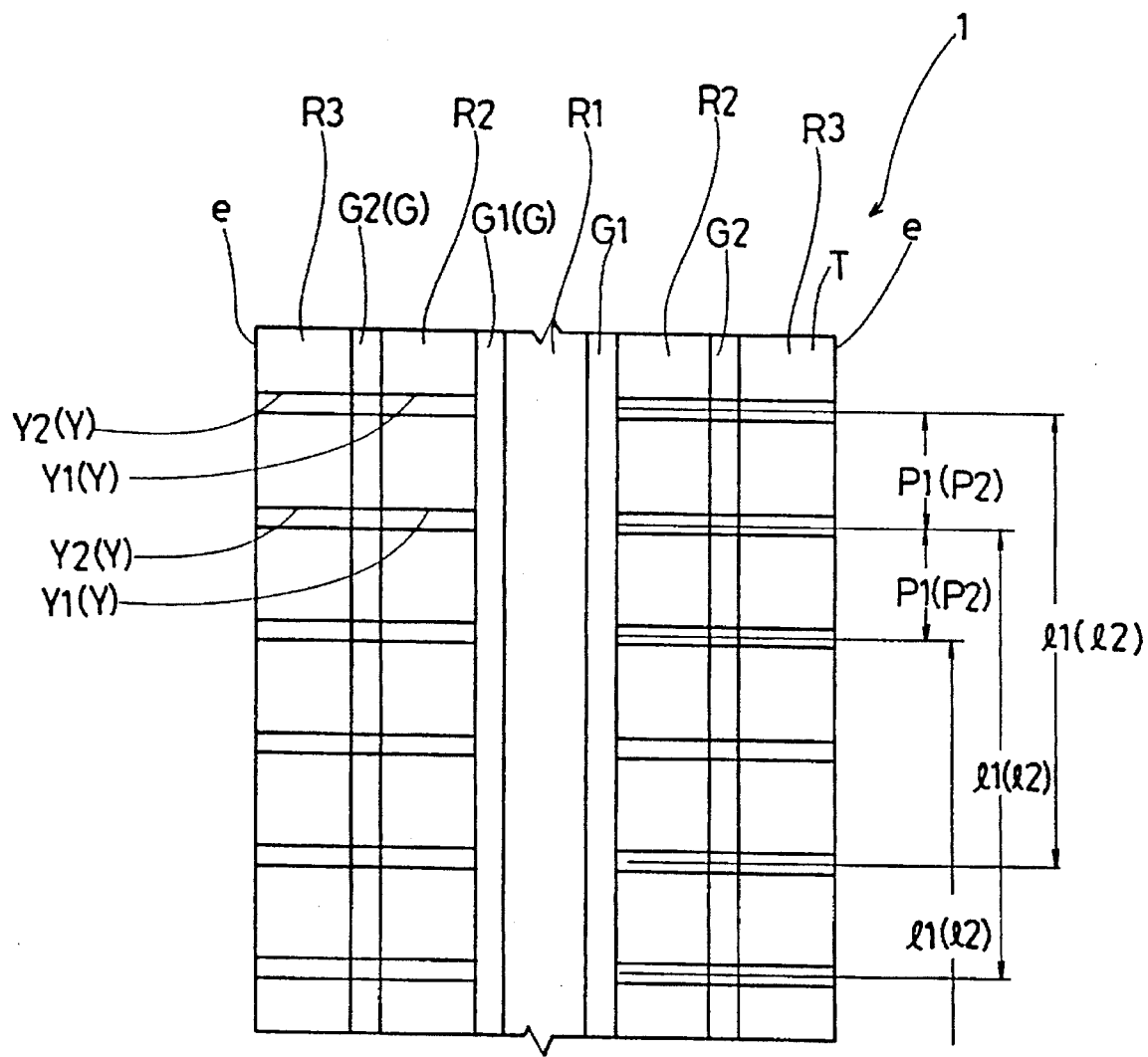
FIG. 1 is a developed plan view showing a tread pattern of one embodiment of the present invention.
Figure 2:
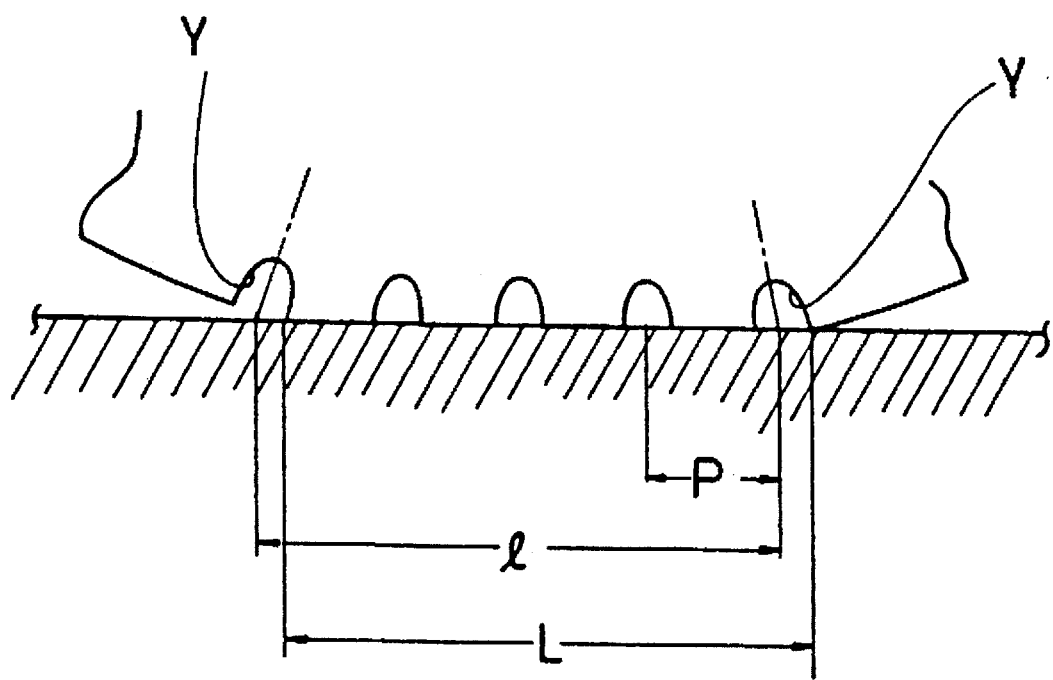
FIG. 2 is a schematic side view of the tire in a ground contacting state.

In FIGS. 1 and 2, the low noise tire 1 is a pneumatic passenger car tire. The tire 1 has a tread portion T provided with four circumferentially continuously extending grooves G which divide the tread portion into a center rib R1 extending along tire equator, two intermediate ribs R2 located one on each side thereof, and two shoulder ribs R3 extending along the tread edges.

In FIGS. 1 and 2, the circumferential grooves G are straight grooves, but zigzag grooves or wavy grooves may be used as the circumferential groove G independently or in appropriate combinations.

The tread portion T is further provided with circumferentially spaced axial grooves Y.

In this embodiment, the axial grooves Y extend axially outwardly from the axially inner circumferential grooves G1 to the tread edges across the axially outer circumferential grooves G2, thereby dividing the intermediate ribs R2 and the shoulder ribs R3 into circumferentially separated blocks.

In other words, the axial grooves Y in this embodiment include the inner axial grooves Y1 extending from the inner circumferential groove G1 to the outer circumferential groove G2, and the outer axial grooves Y2 extending from the outer circumferential groove G2 to the tread edge (e) to open its outer end at the side of the tire.

Further, the axial grooves Y in this embodiment are formed in a straight configuration parallel with the axial direction of the tire, that is, at the right angle to the circumferential groove, but they can be formed with an appropriate bias angle to the axial direction of the tire.

Further, in this embodiment, the axial grooves Y are arranged at regular intervals (pitches) in the circumferential direction of the tire, and the pitches are set so that the ground contacting length L of the tire under standard conditions is substantially equal to a length 1 which is the groove pitch multiplied by an integer N, wherein the above-mentioned standard condition is that the tire is mounted on a regular rim, and inflated to a normal internal pressure and loaded with a normal load.

Preferably, the above-mentioned integer N is 3 to 6, that is, one selected from the integers 3, 4, 5 and 6. When N is smaller than 3, the number of formed axial grooves is insufficient to maintain the wet-grip property. On the other hand, when N is more than 6, the groove number becomes so excessive as to decrease the rigidity of the tread to and thereby deteriorate the running performance of the tire. Furthermore, the increase in the groove number increases the number of generated pulses, and thereby increases pattern noise as a whole.

The above-mentioned ground contacting length L is generally defined as a circumferential length of the ground contact region of the tread portion of the tire measured on the tire equator under the above-mentioned standard condition.

In practice, however, the front and rear edges of the ground contacting region are more or less curved. Accordingly, the circumferential length between the front and rear edges at the axial position of the concerned axial grooves is preferably used as the above-mentioned ground contacting length L.

Further, the actual ground contacting length will vary under actual service conditions.

Therefore, the above-mentioned integral-time pitch length l may have a range which is from 0.97 to 1.03 times the ground contacting length L.

As explained above, in this embodiment, the outer axial groove Y2 and the inner axial groove Y1 are formed at an equal pitch and in the same phase. That is, the pitches P1 of the inner axial grooves Y1 are set to be the same as the pitches P2 of the outer axial grooves Y2, and the axially adjacent inner and outer axial grooves Y1 and Y2 are aligned on a straight line.

However, from the foregoing, it will be understood that only needed is to set the integral-time pitch length l (l1, l2) substantially the same as the ground contacting length in each of the ribs R2 and R3 (which means the axial location of the axial grooves).

Figure 3:
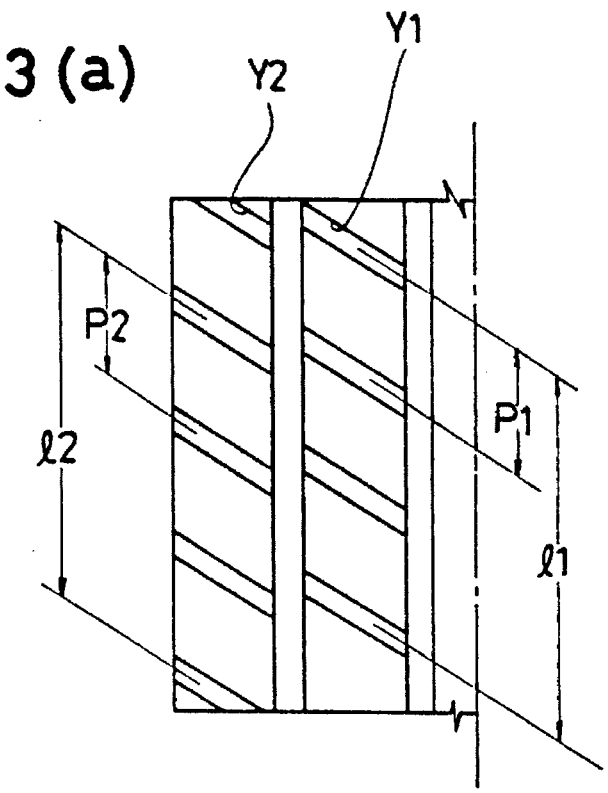
FIGS. 3a and 3b are schematic plan views, each showing another embodiment of the present invention.
Figure 3:
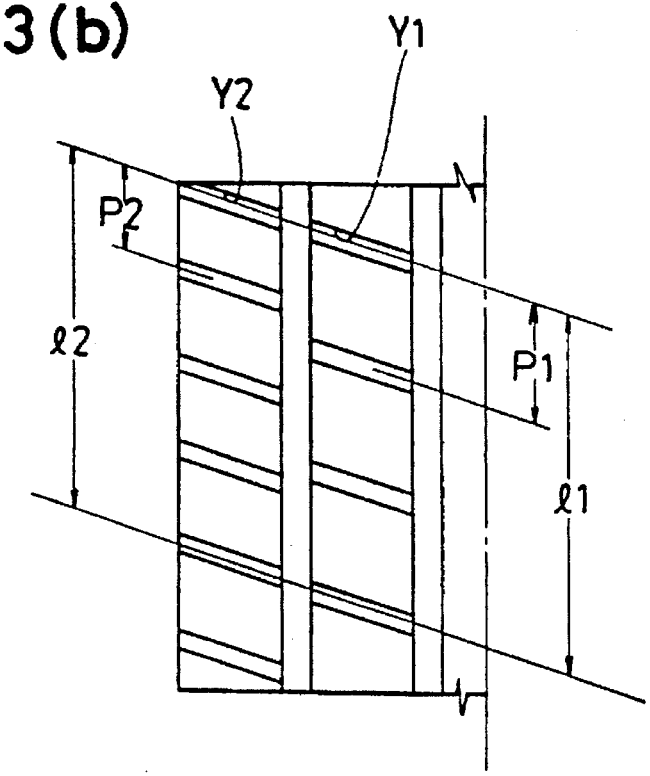

FIGS. 3a and 3b each show another embodiment of the present invention, wherein the axial grooves are arranged at regular intervals (pitches).

in FIG. 3a, the tread portion is provided with four straight circumferential grooves similarly to the foregoing embodiment, but the axial groove Y1 and Y2 are inclined with respect to the tire axial direction. Further, between the inner axial grooves Y1 and the outer axial grooves Y2, the pitch P1 and the interval time pitch length l1 are the same as the pitch P2 and the integral-time pitch length l2, but their circumferential locations differ from each other, that is, their phases are shifted.

In FIG. 3b, the tread pattern is almost the same as that of FIG. 3a except that the pitch P1 of the inner axial grooves Y1 differs from the pitch P2 of the outer axial grooves Y2.

The interger N in the axially outer rib is 4, and the integer N in the axially inner rib is 3.

Furthermore, the present invention can be combined with variable pitching methods. In this case, the mean value of the varied pitches or the circumference divided by the number of the axial grooves is treated as the pitch of the axial grooves. This will apply very well in such a case that there is no periodicity in a block arrangement in the circumferential direction of the tire. Further, in some cases where there is periodicity in the block arrangement, the axial grooves may be arranged such that each of the axial grooves has a paired axial groove spaced apart therefrom by a distance substantially the same as the ground contacting length.

Comparison Test and Results

Radial tires of size 195/60R14 were made for comparison tests. The test tires had an identical tread pattern shown in the above-explained FIG. 1 except for the axial groove pitches.

Each test tire was mounted on a regular rim of size 5½JJ×14 and inflated to a normal pressure of 2.0 kgf/cm$^2$, and the circumference thereof under this condition was 1855 mm. The ground contacting length L thereof under a normal load was 132.5 mm.

The sound pressure level of the test tire was measured. The measurement was performed according to the tire noise testing method specified by JASO-C606, wherein the microphone position is laterally 1 m from the tire equator and vertically 25 cm from the ground contacting face of the tread on the immediate side of the tire. The results of the measurements are shown in FIG. 4.

Figure 4:
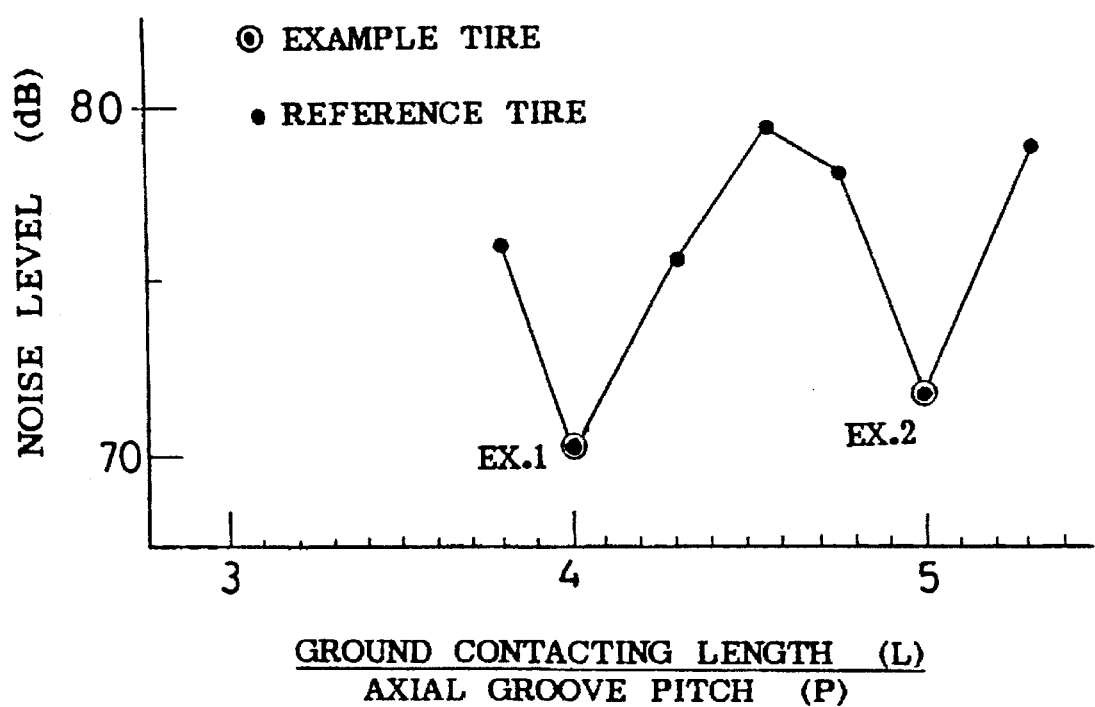
FIG. 4 is a diagram showing a relationship between the ground contacting length divided by groove pitch and noise level in decibels.
Figure 5:
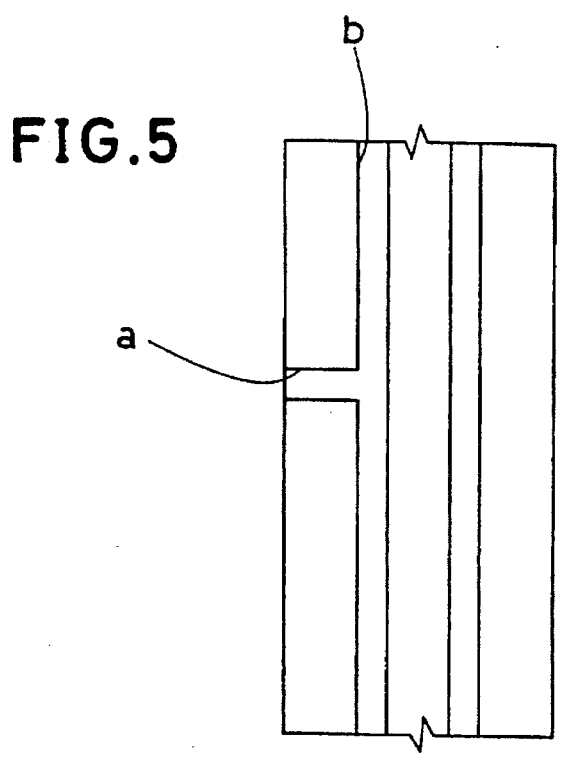
FIG. 5 is a plan view showing a tread pattern used for examination.
Figure 6:
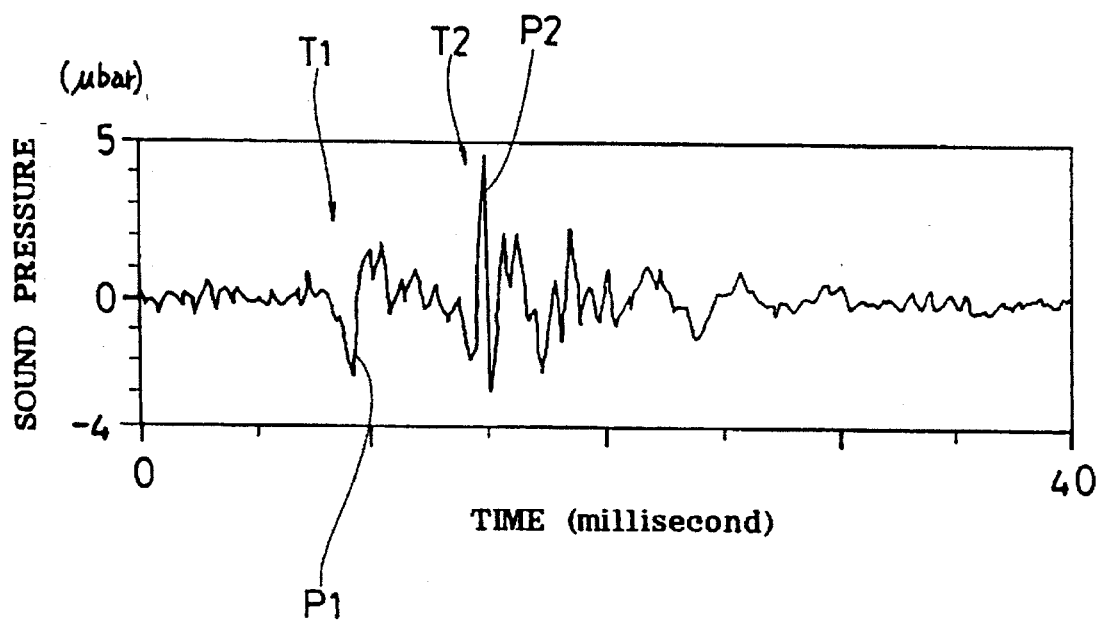
FIG. 6 is a graph showing the waveform of the measured sound pressure thereof.

As shown in FIG. 4, the sound pressure level was remarkably lowered in the example tires 1 and 2 according to the invention as compared with the reference tires.

As described above, in a low noise tire of the present invention, the circumferential pitch of the axial grooves multiplied by an integer is set substantially equal to the ground contacting length of the tire. Therefore, a sound pressure wave generated from the axial groove coming to contact the ground and that generated from the axial groove being released from the ground cancel each other to reduce the pattern noise.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a method of making a low-noise pneumatic tire having a tread with a plurality of axial grooves, the improvement comprising:

determining the ground contacting length of the tread when the tire is mounted on a regular rim, inflated to a normal internal pressure and loaded with a normal load;

forming the plurality of axial grooves at regular pitches on an exterior circumferential surface of the tread, said forming step including the sub-step of setting the pitch length based on the ground contacting length as defined in said determining step so that the ground contacting length is substantially equal to the pitch length multiplied by an integer in the range of from between 3 to 6, such that the tire noise produced by air flowing out of an axial groove contacting the ground is offset by air flowing into a corresponding axial groove leaving the ground.

2. A method of making a low-noise pneumatic tire as recited in claim 1, wherein in said forming step the plurality of axial grooves are formed on both sides of a center rib in the tread of the pneumatic tire.

3. A method of making a low-noise pneumatic tire as recited in claim 2, said forming step further comprising:

disposing one of a pair of inner circumferential grooves on each side of the center rib; and disposing one of a pair of outer circumferential grooves between each of the inner circumferential grooves and a tread edge.

4. A method of making a low-noise pneumatic tire as recited in claim 3, said forming step further comprising:

forming a first set of axial grooves between each of the inner and outer circumferential grooves at a first pitch such that the tire noise produced by air flowing out of a axial groove from the first set of axial grooves contacting the ground is offset by the air flowing into a corresponding axial grooves from the first set of axial grooves leaving the ground; and forming a second set of axial grooves between each of the outer circumferential grooves and the tread edges at a second pitch such that the tire noise produced by air flowing out of an axial groove from the second set of axial grooves contacting the ground is offset by the air flowing into a corresponding axial groove from the second set of axial grooves leaving the ground.

5. A method of making a low-noise pneumatic tire as recited in claim 4, wherein in said steps of forming the first set of axial grooves and forming the second set of axial grooves, the first and second pitches coincide.

6. A method of making a low-noise pneumatic tire as recited in claim 4, wherein in said steps of forming the first set of axial grooves and forming the second set of axial grooves, the first and second pitches do not coincide.

7. A method of making a low-noise pneumatic tire as recited in claim 1, wherein in said forming step the pitch multiplied by an integer in the range of between 3 to 6 is equal to 0.97 to 1.03 of the ground contacting length.

8. A method of making a low-noise pneumatic tire as recited in claim 1, wherein said forming step further comprises the step of positioning each of the plurality of axial grooves in a perpendicular position with respect to the circumferential direction of the tire.

9. A method of making a low-noise pneumatic tire as recited in claim 1, wherein said forming step further comprises the step of positioning each of the plurality of axial grooves at a common bias angle with respect to the circumferential direction of the tire.

10. In a method of making a low-noise pneumatic tire having a tread with a plurality of axial grooves, the improvement comprising:

determining the axial position of an annular part of the tread divided in the tire circumferential direction by said plurality of axial grooves;

determining the ground contacting length of the tread at said axial position when the tire is mounted on a regular rim, inflated to a normal internal pressure and loaded with a normal load;

selecting the pitch length of said plurality of axial grooves based on the the ground contacting length as defined in said determining step so that 0.97 to 1.03 of the ground contacting length is equal to the pitch length multiplied by an integer in the range of from between 3 to 6; and forming said plurality of axial grooves at the selected pitches so that the tire noise produced by air flowing out of an axial groove contacting the ground is offset by air flowing into a corresponding axial groove leaving the ground.

* * * * *